(12) United States Patent
Takizuka et al.

(10) Patent No.: US 8,213,987 B2
(45) Date of Patent: Jul. 3, 2012

(54) TERMINAL DEVICE CAPABLE OF OUTPUTTING IMAGE DATA TO EXTERNAL DISPLAY DEVICE IN SUPPORTED IMAGE FORMAT

(75) Inventors: Reiko Takizuka, Saitama (JP); Kosuke Nishimura, Saitama (JP)

(73) Assignee: KDDI Corporation, Tokyo (JP)

( * ) Notice: Subject to any disclaimer, the term of this patent is extended or adjusted under 35 U.S.C. 154(b) by 203 days.

(21) Appl. No.: 12/695,378

(22) Filed: Jan. 28, 2010

(65) Prior Publication Data

US 2010/0210303 A1 Aug. 19, 2010

(30) Foreign Application Priority Data

Feb. 17, 2009 (JP) .................................. 2009-033434

(51) Int. Cl.
*H04B 1/38* (2006.01)
(52) U.S. Cl. ...................... 455/557; 455/566; 455/414.1; 455/41.2; 455/556.1; 382/173
(58) Field of Classification Search .................. 455/557, 455/566, 414.4, 556.1, 41.2; 382/173
See application file for complete search history.

(56) References Cited

U.S. PATENT DOCUMENTS

| 2005/0041859 A1* | 2/2005 | Nguyen et al. ................ 382/173 |
| 2008/0214239 A1* | 9/2008 | Hashimoto et al. ........... 455/557 |

FOREIGN PATENT DOCUMENTS

JP  2008-211379 A  9/2008

* cited by examiner

*Primary Examiner* — April G Gonzales
(74) *Attorney, Agent, or Firm* — Westerman, Hattori, Daniels & Adrian, LLP

(57) ABSTRACT

A terminal device usable in connection with an external display device is disclosed, which receives a plurality of sub-image data sets into which an original image data set has been divided, with each sub-image data set having a size within a display area size of the terminal device; converts an image format of the plurality of sub-image data sets into the same image-format as an image format of the external display device, on a per-sub-image-data-set basis; regenerates the original image data set from the plurality of format-converted sub-image data sets, such that the original image data set is formed in its entirety or in plural data blocks; and outputs the regenerated original-image-data-set to the external display device.

11 Claims, 4 Drawing Sheets

TERMINAL DEVICE CAPABLE OF OUTPUTTING IMAGE DATA TO EXTERNAL DISPLAY DEVICE IN SUPPORTED IMAGE FORMAT

CROSS-REFERENCE TO RELATED APPLICATIONS

The present application is based on and claims the benefit of priority from Japanese Patent Application No. 2009-33434 filed Feb. 17, 2009, the content of which is incorporated herein by reference in its entirety.

BACKGROUND OF THE INVENTION

1. Field of the Invention

The invention relates generally to terminal devices capable of outputting image data to external display devices in a supported image format by these external display devices.

2. Description of the Related Art

There is known a system in which an external display device having a larger display screen and a portable terminal device (or a mobile device, a data terminal) having a smaller display screen are interconnected. See, for example, Japanese Patent Application Publication No. 2008-211379.

In the above-stated system, the external display device displays original image data entirely (i.e., as the whole image), while the portable terminal device displays the same original image data in part (i.e., as a selected one of sub-images of the whole image).

More specifically, the portable terminal device divides the whole original image represented by original image data, into a plurality of sub-images, and displays a selected one of the sub-images on a display screen of the portable terminal device.

The thus-configured system allows a user to take a desired action on a particular sub-image displayed on the screen of the portable terminal device, while viewing the whole original image displayed on the screen of the external display device.

FIG. 1 illustrates the configuration of a conventional system in block diagram.

As illustrated in FIG. 1, a portable terminal device 1 and an external display device 2 are interconnected by wire (e.g., via a USB cable) or wirelessly (e.g., via a wireless LAN (Local Area Network), Bluetooth, infrared signals, etc.). The portable terminal device 1 is in the form of, for example, a cellular phone, a mobile phone, a pager or a PDA (Personal Data Assistant), each of which has a display screen having a relatively small area for displaying. The external display device 2 is in the form of, for example, an electronic paper display device, which has a relatively large area for displaying.

The "electronic paper display device" has a display screen of a reflective display type which allows a user to view an image because of reflection of external light. This electronic paper display device is of a non-volatile type which requires electric power only when a displayed image is rewritten or updated.

Many of various types of electronic paper display devices receive text/picture information from other devices such as information terminal devices, and each of such electronic paper display devices acts as if it were a sheet of "paper" on which a text/picture represented by the received data has been printed. Such electronic paper display devices are typically used for displaying still pictures, because of a relatively slow speed of drawing.

Further, the portable terminal device 1 is connected with the Internet via an access network (e.g., a cellular phone network). With the Internet, a server 3 is also connected which has stored original image data. The portable terminal device 1 receives the original image data from the server 3, and then delivers the original image data to the external display device 2. This allows the server 3 to activate the external display device 2 via the portable terminal device 1, to thereby allow the external display device 2 to display the original image data which has been stored in the server 3.

Standard image-formats used for image data transmitted/received over the Internet include, for example, a jpeg (Joint Photographic Experts Group) format which is used for compressing bitmap data. In an example, a terminal device, after receiving compressed image data in a jpeg format, decompresses the compressed image data into bitmap data, and displays an image using the bitmap data.

However, many of existing electronic paper display devices cannot display an image using intact bitmap data which is produced based on three primary colors which are red (R), green (G) and blue (B) (i.e., RGB).

Such electronic paper display devices can display only image data produced in an RGBW modified bitmap format which is defined by, for example, white (W) plus RGB. This requires a server to store the same image content both in a jpeg format and in an RGBW modified bitmap format, for the purpose of allowing, such electronic paper display devices to display the image content supplied from the server.

An alternative approach can be assumed to achieve the same goal in which a portable terminal device such a personal computer decompresses original image data which has been received from a server in a jpeg format, and converts the format of the entire image data, from a jpeg format into an RGBW modified bitmap format, at a time.

A terminal device such as a cellular phone which is low in storage capacity and processing ability (e.g., speed) could not format-convert the entire original image data at a time. In general, a cellular phone is designed to have memory capacity and processing ability enough to support operation of a small-sized display screen mounted in the cellular phone. As a result, it is insufficient for such a cellular phone to process, at a time, a large amount of image data which is to be outputted to an electronic paper display device having a larger display screen than that of the cellular phone.

In an industry of an electronic paper display device, the technological development has promoted an electronic paper display device to be designed to be smaller in thickness and weight than before, which allows the electronic paper display device to be intended as a hand-held display. A situation can be easily assumed in which a user carries with her or him both a cellular phone and such an electronic paper display device together. This could increase a user's need for allowing a terminal device such as a cellular phone to output to an external display device such as an electronic paper display device, image data received from an external device such as a server.

In view of the foregoing, it would be desirable to allow a terminal device, even if it is low in storage capacity and processing ability, to output image data to an external display device such as an electronic paper display device.

BRIEF SUMMARY OF THE INVENTION

In general, the invention relates to techniques of outputting image data from a terminal device to an external display device in a supported image format by the external display device.

According to some aspects of the invention, a terminal device usable in connection with an external display device, receives a plurality of sub-image data sets into which an original image data set has been divided such that each sub-image data set represents a corresponding one of sub-images of an original image represented by the original image data set, with each sub-image having a size within a display area size of the terminal device.

The terminal device further converts an image format of the plurality of sub-image data sets into the same image-format as an image format of the external display device, on a per-sub-image-data-set basis.

The terminal device still further regenerates the original image data set from the plurality of format-converted sub-image data sets, such that the original image data set is formed in its entirety using an array of the plurality of sub-image data sets, or in plural data blocks each using an array of a sub-plurality of the plurality of sub-image data sets.

The terminal device additionally outputs the regenerated original-image-data-set to the external display device.

It is noted here that, as used in this specification, the singular form "a," "an," and "the" include plural reference unless the context clearly dictates otherwise. It is also noted that the terms "comprising," "including," and "having" can be used interchangeably.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

General Overview

Figure 1:
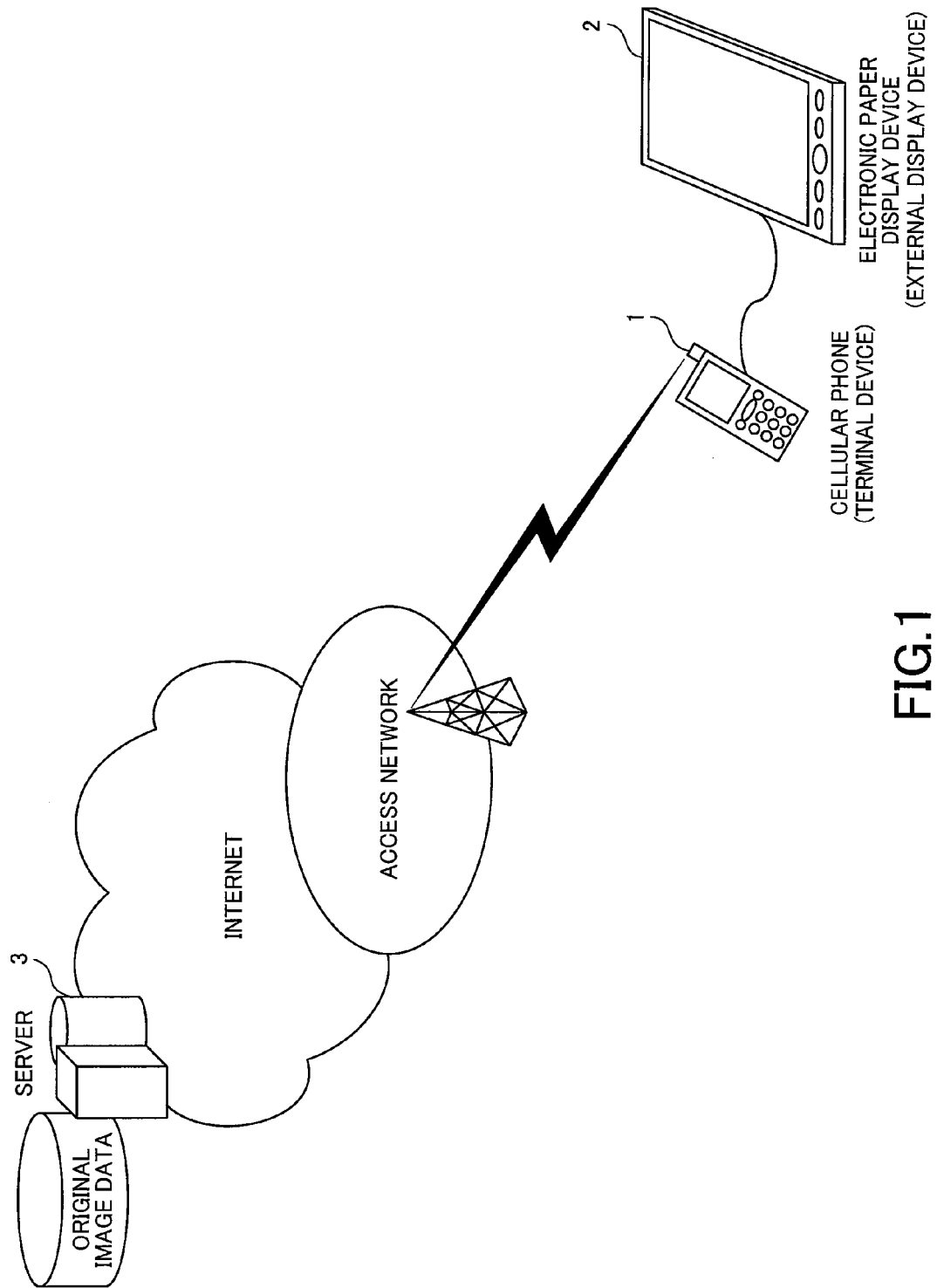
FIG. 1 is a schematic diagram illustrating a conventional system in which a portable terminal device and an external display device are interconnected.

According to a first aspect of the invention, there is provided a terminal device usable in connection with an external display device, comprising:

a sub-image receiver configured to receive a plurality of sub-image data sets into which an original image data set has been divided such that each sub-image data set represents a corresponding one of sub-images of an original image represented by the original image data set, with each sub-image having a size within a display area size of the terminal device;

a format converter configured to convert an image format of the plurality of sub-image data sets into a same image-format as an image format of the external display device, on a per-sub-image-data-set basis;

an original-image regenerator configured to regenerate the original image data set from the plurality of format-converted sub-image data sets, such that the original image data set is formed in its entirety using an array of the plurality of sub-image data sets, or in plural data blocks each using an array of a sub-plurality of the plurality of sub-image data sets; and an output device configured to output the regenerated original-image-data-set to the external display device.

This terminal device, even if it is low in storage capacity and processing ability, could output to an external display device, image data received from the external, in a supported image format by the external display device, after format-converting the received image data on a per-sub-image basis.

According to a second aspect of the invention, there is provided a method of operating a terminal device usable in connection with an external display device, the method comprising the steps of:

receiving a plurality of sub-image data sets into which an original image data set has been divided such that each sub-image data set represents a corresponding one of sub-images of an original image represented by the original image data set, with each sub-image having a size within a display area size of the terminal device;

converting an image format of the plurality of sub-image data sets into a same image-format as an image format of the external display device, on a per-sub-image-data-set basis;

regenerating the original image data set from the plurality of format-converted sub-image data sets, such that the original image data set is formed in its entirety using an array of the plurality of sub-image data sets, or in plural data blocks each using an array of a sub-plurality of the plurality of sub-image data sets; and outputting the regenerated original-image-data-set to the external display device.

This method, even if a to-be-operated terminal device is low in storage capacity and processing ability, could output to an external display device, image data received from the external, in a supported image format by the external display device, after format-converting the received image data on a per-sub-image basis.

Illustrative Embodiments

According to the invention, the following modes are provided as illustrative embodiments of the invention.

According to a first mode of the invention, there is provided the terminal device according to the first aspect of the invention, wherein the terminal device is a mobile phone, the external display device is an electronic paper display device, and a display area size of the mobile phone is not larger than a size for QVGA (Quarter Video Graphic Array).

According to a second mode of the invention, there is provided the terminal device according to the first mode of the invention, wherein the image format of the plurality of sub-image data sets is a 24-bit bitmap format, the image format of the electronic paper display device is an RGBW modified bitmap format, and the format converter is configured to convert the 24-bit bitmap format into the RGBW modified bitmap format, on a per sub-image-data-set basis.

According to a third mode of the invention, there is provided the terminal device according to any one of the first aspect and the first and second modes of the invention, wherein the original-image regenerator is configured to regenerate the original image data set in plural data blocks, such that each data block is formed in a linear array of at least two of the plurality of sub-image data sets, and such that zero-value pixel regions are added to each data block at both ends, for a match between a length of each data block and the display area size of the external display device, and the output device is configured to output the regenerated original-image-data-set, on a per-data-block basis.

According to a fourth mode of the invention, there is provided the terminal device according to any one of the first aspect and the first through third modes of the invention, wherein the plurality of sub-image data sets have been assigned file names which can identify positions of corresponding respective sub-image data sets, relative to the original image data set, and the original-image regenerator is configured to sequence the plurality of sub-image data sets by the file names.

According to a fifth mode of the invention, there is provided the terminal device according to any one of the first aspect and the first through third modes of the invention, wherein the plurality of sub-image data sets have been assigned positional coordinates which can identify positions of corresponding respective sub-image data sets, relative to the original image data set, and the original-image regenerator is configured to sequence the plurality of sub-image data sets by the positional coordinates.

According to still another aspect of the invention, there is provided a system comprising:

the terminal device according to any one of the first aspect and the first through fifth modes of the invention; and a server storing the original image data set, wherein the server comprises:

an image divider configured to divide the original image data set for which has been requested by the terminal device, into the plurality of sub-image data sets such that a size of each sub-image data set is within the display area size of the terminal device; and a sub-image transmitter configured to transmit to the terminal device the plurality of sub-image data sets produced by the image divider.

According to yet another aspect of the invention, there is provided a computer-executable program which, when executed by a computer, effects the method according to the second aspect of the invention.

The "computer-readable medium" may be realized in any one of a variety of types, including a magnetic recording medium, such as a flexible-disc, an optical recording medium, such as a CD and a CD-ROM, an optical-magnetic recording medium, such as an MO, an un-removable storage, such as a ROM, for example.

Several presently preferred embodiments of the invention will be described in more detail by reference to the drawings in which like numerals are used to indicate like elements throughout.

Figure 2:
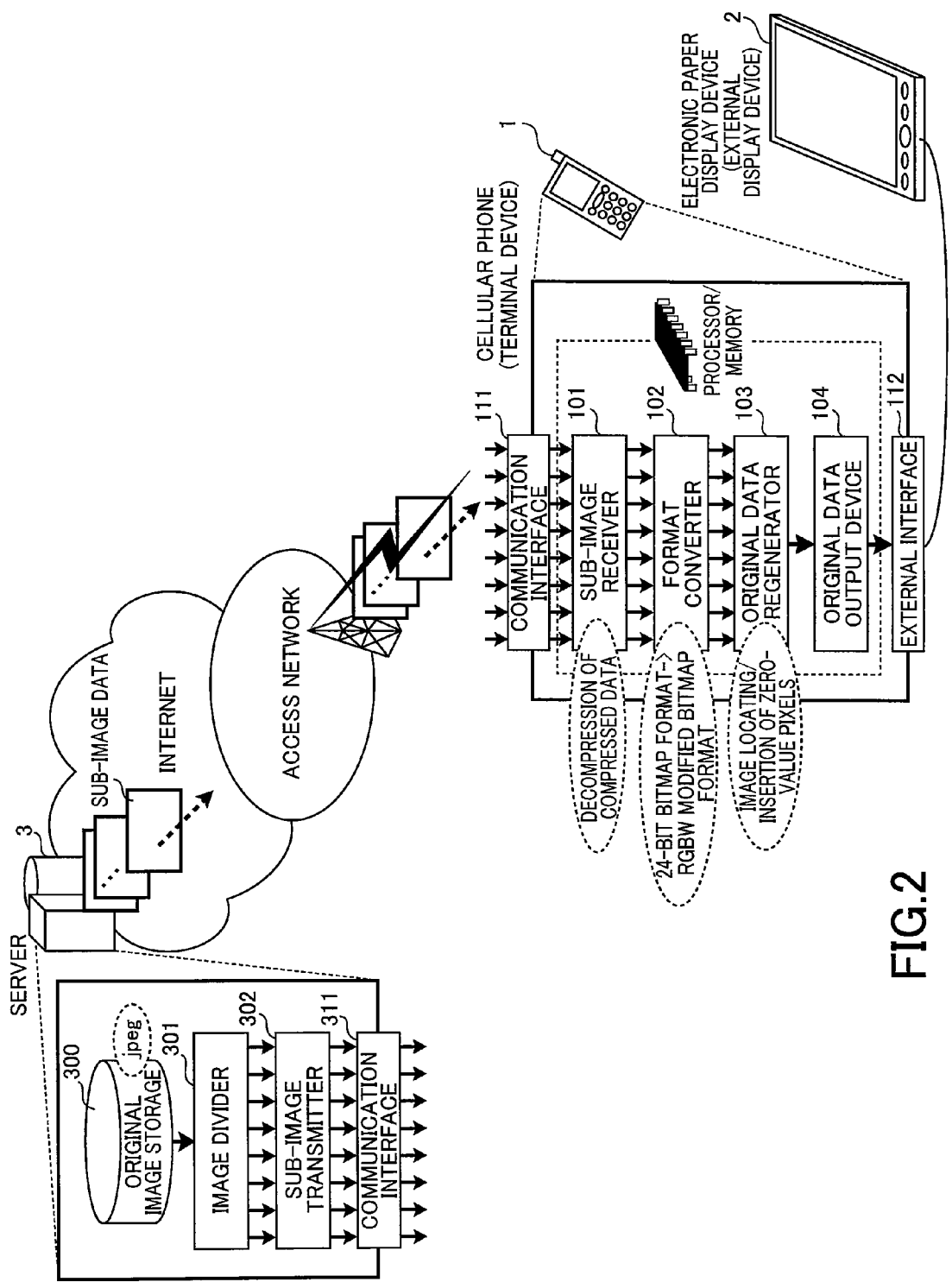
FIG. 2 is a schematic diagram illustrating a system in which a portable terminal device and an external display device are interconnected, wherein the system and the portable terminal device are constructed according to an illustrative embodiment of the present invention.
Figure 3:
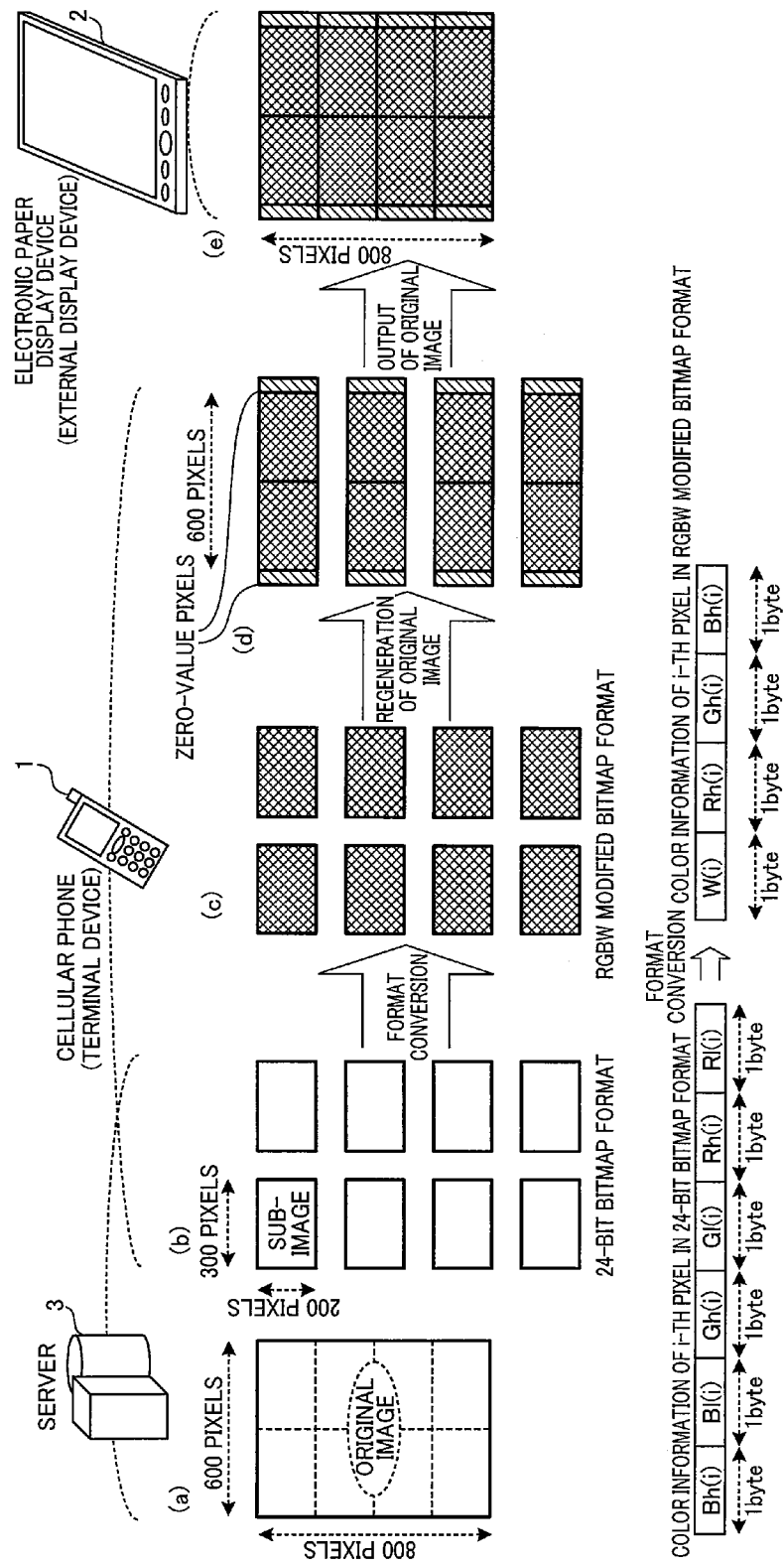
FIG. 3 is a process chart illustrating how to convert between image formats according to the present embodiment.

FIG. 2 is a functional block diagram illustrating a cellular phone or mobile phone 1 as an exemplary terminal device and a server both of which are constructed according to an illustrative embodiment of the present invention. FIG. 3 illustrates image format conversion sequence according to the present embodiment.

The server 3 is configured to incorporate an original-image storage 300; an image divider 301; a sub-image transmitter 302; and a communication interface 311 allowing the server 3 to connected with the Internet. These functions are provided by operating a computer (not shown) mounted in the server 3 to execute a computer program (not shown). In response to a request issued from the cellular phone 1, the server 3 transmits an original image data set to the cellular phone 1. The original image data set represents an original image which is a raw image or a pre-divided image.

The original-image storage 300 stores an original image data set in a bitmap compression format. For a typical display, each pixel is assigned 24-bit data in which 8 bits are for red, 8 bits are for green, and 8 bits are for blue. This allows 256 possible levels of values and saturation, per each hue (i.e., per each primary color). In other words, it is possible to define a single pixel with one of 16,777,216 ($=256^3$) possible combinations (i.e., colors) of hue, value and saturation.

The original image data set in a 24-bit bitmap format may be data compressed in the jpeg (ISO/IEC JTC 1/SC 29/WG 1, Joint Photographic Experts Group) format. The jpeg is a standard format for compression of a still picture.

The image divider 301 divides an original image data set requested from the cellular phone 1, into a plurality of sub-image data sets each having a size within the size of a display screen of the cellular phone 1. In this regard, the whole original image data set is divided into a plurality of sub-image data sets each having a size within or not greater than a size for QVGA (Quarter Video Graphic Array).

The cellular phone 1 has a QVGA display with a resolution of 320×240 pixels. A QVGA display has vertical pixels and horizontal pixels whose numbers are half the numbers of those pixels of a VGA (Video Graphic Array) display, and the total pixel number of the QVGA display is quarter the total pixel number of the VGA display. In an example in which the whole original image data set has an image size of 600×800 pixels (see FIG. 3(a)), the original image data set is divided into eight sub-image data sets each having an image size of 300×200 pixels (see FIG. 3(b)). Each sub-image data set represents a corresponding one of sub-images which form, when combined together, the entire original image.

The sub-image transmitter 302 transmits those sub-image data sets to the cellular phone 1. In an example, the server 3, in response to a request for transmission of one original image data set having an image size of 600×800 pixels, transmits the eight sub-image data sets each having an image size of 300× 200 pixels to the cellular phone 1 (see FIG. 3(b)).

In addition, an electronic paper display device 2 which is intended for displaying the original image data set, displays image data in an RGBW modified bitmap format. In an example, a display screen of the electronic paper display device 2 has a size of 600×800 pixels.

Current typical liquid-crystal-displays use color filters for RGB or three colors, for multi-color display, with each color assigned 8-bit information for multi-tone representation, and with each pixel assigned 24-bit information.

On the other hand, the electronic paper display device 2 operating based on reflection of external light uses a white (W) color filter in addition to RGB color filters, for improvement in reflectively of light, in many cases.

As a result, for the electronic paper display device 2 to display a multi-color image, it is impossible to use an image format (or image file format) intactly, such as a bitmap format that is used by a liquid crystal display intended for image representation by three primary colors.

In addition, the electronic paper display device 2, in many cases, can display an image at a fewer number of tone levels than a liquid crystal display.

For an "RGBW modified bitmap format" which is an image format for use in the electronic paper display device 2, each pixel is assigned 16-bit information (see FIG. 3(c)). Red, green and blue are each assigned 4 bits per pixel.

The 4 bits for red in the RGBW modified bitmap format are equal to the high-order 4 bits of the total 8 bits for red in the 24-bit bitmap format, the 4 bits for green in the RGBW modified bitmap format are equal to the high-order 4 bits of the total 8 bits for green in the 24-bit bitmap format, and the 4 bits for blue in the RGBW modified bitmap format are equal to the high-order 4 bits of the total 8 bits for blue in the 24-bit bitmap format (see FIGS. 3(c) and 3(d)). The RGBW modified bitmap format further includes 4 bits for white per pixel. As a result, each pixel is represented in 16 bits, that is, 4 bits for red, 4 bits for green, 4 bits for blue, and 4 bits for white.

As illustrated in FIG. 2, between the server 3 and the electronic paper display device 2, the cellular phone 1 is located.

The cellular phone 1 is configured to include a communication interface 111 allowing for connection with an access network, and an external interface 112 allowing for connection with the electronic paper display device 2. The cellular phone 1 further includes a sub-image receiver 101; a format converter 102; an original-image regenerator 103; and an original-image output device 104. These functions are provided by executing a program (not shown) by a computer (not shown) mounted in the cellular phone 1.

The sub-image receiver 101 receives from the server 3 a plurality of sub-image data sets (see FIG. 3(b)). The sub-image receiver 101 decompresses each sub-image data set, when in a compressed format. Those sub-image data sets are generated by dividing an original image data set, such that each sub-image data set has a size within the size of a display screen of the cellular phone 1. The sub-image receiver 101 delivers these sub-image data sets to the format converter 102.

The format converter 102 converts an image format of those sub-image data sets into the same format as an image format of the electronic paper display device 2, on a per-sub-image basis (see FIG. 3(c)). In an example where the image format of the sub-image data sets is a 24-bit bitmap format, while the image format of the electronic paper display device 2 is an RGBW modified bitmap format (or simply, an RGBW bitmap format), the format converter 102 converts a 24-bit bitmap format of the sub-image data sets into an RGBW modified bitmap format. The format converter 102 outputs to the original-image regenerator 103, the resulting sub-image data sets in an RGBW modified bitmap format, on a per-sub-image basis.

In a first implementation, the original-image regenerator 103 regenerates the original image data set entirely, from all the sub-image data sets, such that the entire area of an original image represented by the original image data set is represented by sequencing all the sub-image data sets, that is, such that the entire original image is in an array of all the sub-images.

In a second implementation, the original-image regenerator 103 regenerates the original image data set in plural horizontal sub-image data blocks, such that each horizontal sub-image data block is formed by sequencing at least two sub-image data sets horizontally in a line. The original-image regenerator 103 produces horizontal sub-image data blocks, at a first step, for regenerating the original image data set in separate parts. A horizontal linear array of sub-images can be referred to as a horizontal image block.

It is added that, as illustrated in FIG. 3(d), a case can exist where the horizontal length of a display screen of the electronic paper display device 2 is longer than the horizontal length of one image block. One image block is represented by one horizontal sub-image data block which is in an array of two sub-image data sets.

In this case, the original-image regenerator 103, at a second step, adds zero-data pixel regions (i.e., no-data pixel regions) to each horizontal sub-image data block at both ends (i.e., left-hand and right-hand ends) for extension of each data block, so that the extended data block can be equal in length to the horizontal dimension of the display screen of the electronic paper display device 2.

The addition of zero-data pixel regions fills the gaps between each horizontal sub-image data block and the display screen of the electronic paper display device 2. Each zero-value pixel region has no color, as if it were a transparent pixel.

As illustrated in FIG. 3(d), the zero-value pixel regions are added to each horizontal sub-image data block at its right-hand and left-hand ends for extension. In an example, the zero-value pixel regions are substantially equal in length between on the right-hand and left-hand sides.

The original-image output device 104 outputs to the electronic paper display device 2 via the external interface 112 the original image data set regenerated in an RGBW modified bitmap format, whether it is regenerated entirely or in parts.

In an exemplary implementation, the original-image output device 104 may output the original image data set in horizontal sub-image data blocks. In this implementation, the cellular phone 1 is allowed to regenerate the original image data set in horizontal sub-image data blocks, or at separate times, using a data storage having capacity required less than when the cellular phone 1 is required to reproduce the same original image data set entirely, or at a time.

Figure 4:
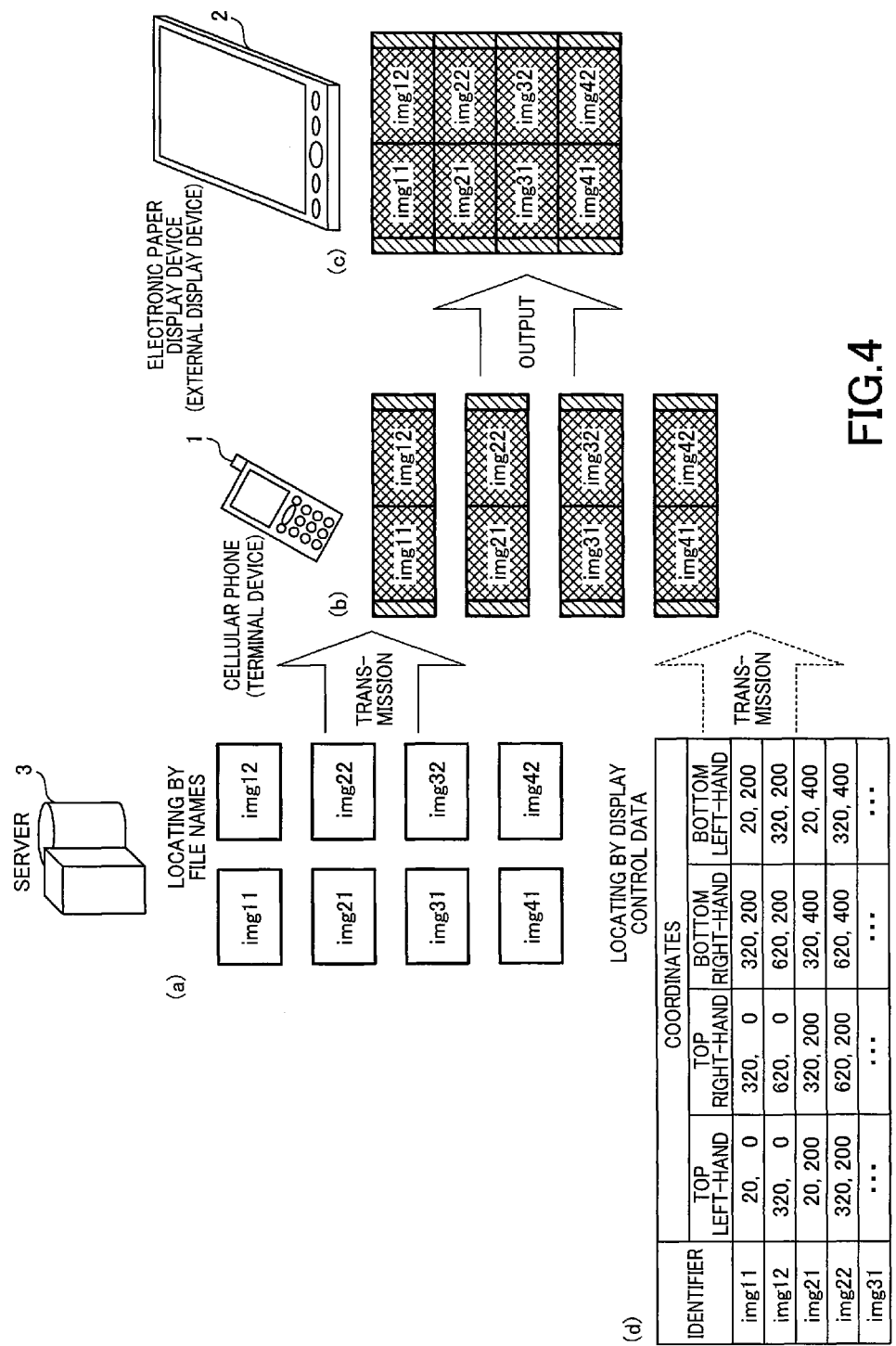
FIG. 4 is a process chart illustrating how to locate sub-image data sets to regenerate an original image data set, according to the present embodiment.

FIG. 4 is for illustration of how the sub-image data sets are sequenced or located for regeneration of the original image data set.

The sub-image data sets depicted in FIG. 4 are located under control of the original-image regenerator 103 of the cellular phone 1. In the present embodiment, the sub-image data sets are located for regeneration of the original image data set, by a first method by which the sub-image data sets are located by their file names, or a second method by which the sub-image data sets are located by display control data which is additionally attached to the sub-image data sets.

For the first method to be implemented, there are attached to the sub-image data sets, their respective file names such as img11.jpg, img12.jpg, img21.jpg, img22.jpg, img31.jpg, etc. In this regard, their file names are denoted collectively as img.XY in which "X" represents the sequence number of each sub-image data set in a horizontal direction, and "Y" represents the sequence number of each sub-image data set in a vertical direction. Therefore, each file name can identify the two-dimensional location of a corresponding one of the sub-image data sets, relative to the whole original image data set to be regenerated, without relying on any other data. This first method would not require additional display control data, for locating the sub-image data sets, as opposed to the second method.

Alternatively, for the second method to be implemented, there are attached to the sub-image data sets formed in data files, their display control data sets including their positional coordinates on a file-by-file basis.

The positional coordinates for each sub-image data set include an X-coordinate value indicating the position of at least one selected pixel in a horizontal direction, and a Y-coordinate value indicating the position of the at least one selected pixel in a vertical direction. In an example, the two-dimensional position of each sub-image is indicated by four sets of X- and Y-coordinates of four pixels located at four corners of each sub-image, which are the top left-hand corner, the top right-hand corner, the bottom right-hand corner and the bottom left-hand corner of each sub-image.

Such display control data, together with the plurality of sub-image data sets, is included in data such as meta data, and the data is received by the cellular phone 1. The cellular phone 1, upon reception, sequences and locates the plurality of sub-image data sets, according to their two-dimensional positions identified on a file-by-file basis. This second method would allow each sub-image data set to be located with a greater flexibility than when the first method is implemented instead.

As will be readily understood from the foregoing, the present embodiment would allow the cellular phone 1 to format-convert the sub-image data sets, with each sub-image data set having a reduced image size for QVGA, which allows the cellular phone 1, even if it is low in storage capacity and processing ability, to output to the electronic paper display device 2, image data, upon reception from the server 3.

Further, the present embodiment would allow the server 3 to store the original image data with an arbitrary size of data, irrespective of which type of an image format is employed in the electronic paper display device 2.

Still further, the present embodiment would allow the cellular phone 1 that is owned by the user, to perform format conversion, without requiring any additional server to convert an image format of an existing original image data set into an image format of the electronic paper display device 2, provided that the server 3 divides the original image data set into a plurality of sub-image data sets each having a size equal to or smaller than a size for QVGA.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A terminal device usable in connection with a server and an external display device,
    wherein the server is configured to store an original image data set, divide the original image data set into a plurality of sub-image data sets, such that a size of each sub-image data set is within a display area size of the terminal device, and transmit the plurality of sub-image data sets to the terminal device, the terminal device comprising:
    a sub-image receiver configured to receive the plurality of sub-image data sets from the server;
    a format converter configured to convert an image format of the plurality of sub-image data sets into a same image-format as an image format of the external display device, on a per-sub-image-data-set basis, the image format defining at least one of color information and tone level information assigned to each pixel of an image to be displayed;
    an original-image regenerator configured to regenerate the original image data set from the plurality of format-converted sub-image data sets in a form of an entire set of data by sequencing and combining the plurality of sub-image data sets, or in a form of a plurality of separate data blocks each of which is formed by sequencing and combining a sub-plurality of the plurality of sub-image data sets; and
    an output device configured to output the regenerated entire set of data or data blocks to the external display device.

2. The terminal device according to claim 1, wherein the terminal device is a mobile phone,
    the external display device is an electronic paper display device, and
    a display area size of the mobile phone is not larger than a size for QVGA (Quarter Video Graphic Array).

3. The terminal device according to claim 2, wherein the image format of the plurality of sub-image data sets is a 24-bit bitmap format,
    the image format of the electronic paper display device is an RGBW modified bitmap format, and
    the format converter is configured to convert the 24-bit bitmap format into the RGBW modified bitmap format, on a per-sub-image-data-set basis.

4. The terminal device according to claim 1, wherein the original-image regenerator is configured to regenerate the data blocks, such that each data block is formed in a linear array of at least two of the plurality of sub-image data sets, and such that zero-value pixel data sets are added to each data block at both ends, for a match between a length of each data block and the display area size of the external display device, and
    the output device is configured to output the regenerated the at least one block data with the added zero-value pixel data sets, on a per-data-block basis.

5. The terminal device according to claim 1, wherein the plurality of sub-image data sets have been assigned file names which can identify positions of corresponding respective sub-image data sets, relative to the original image data set, and
    the original-image regenerator is configured to sequence the plurality of sub-image data sets by the file names.

6. The terminal device according to claim 1, wherein the plurality of sub-image data sets have been assigned positional coordinates which can identify positions of corresponding respective sub-image data sets, relative to the original image data set, and
    the original-image regenerator is configured to sequence the plurality of sub-image data sets by the positional coordinates.

7. A system comprising:
    the terminal device according to claim 1; and
    the server according to claim 1.

8. The terminal device according to claim 1, wherein the server is configured to store the original image data set in a predetermined image format, without reference to a type of the image format of the external display device, and
    the server is further configured to divide the original image data set into the plurality of sub-image data sets, such that each sub-image data set has a predetermined size allowing for the display area size of the terminal device, without reference to the display area size of the external display device.

9. The system according to claim 7, wherein the server is configured to store the original image data set in a predetermined image format, without reference to a type of the image format of the external display device, and
    the server is further configured to divide the original image data set into the plurality of sub-image data sets, such that each sub-image data set has a predetermined size allowing for the display area size of the terminal device, without reference to the display area size of the external display device.

10. A method of operating a terminal device usable in connection with a server and an external display device,
    wherein the server is configured to store an original image data set, divide the original image data set into a plurality of sub-image data sets, such that a size of each sub-image data set is within a display area size of the terminal device, and transmit the plurality of sub-image data sets to the terminal device, the method comprising:

receiving the plurality of sub-image data sets from the server;

converting an image format of the plurality of sub-image data sets into a same image-format as an image format of the external display device, on a per-sub-image-data-set basis, the image format defining at least one of color information and tone level information assigned to each pixel of an image to be displayed;

regenerating the original image data set from the plurality of format-converted sub-image data sets in a form of an entire set of data by sequencing and combining the plurality of sub-image data sets, or in a form of a plurality of separate data blocks each of which is formed by sequencing and combining a sub-plurality of the plurality of sub-image data sets; and outputting the regenerated entire set of data or data blocks to the external display device.

11. The method according to claim 10, wherein the server is configured to store the original image data set in a predetermined image format, without reference to a type of the image format of the external display device, and the server is further configured to divide the original image data set into the plurality of sub-image data sets, such that each sub-image data set has a predetermined size allowing for the display area size of the terminal device, without reference to the display area size of the external display device.

* * * * *